US012624967B2

(12) United States Patent (10) Patent No.: US 12,624,967 B2
Noguchi et al. (45) Date of Patent: May 12, 2026

(54) LOCATION DETECTION DEVICE AND ELECTRONIC APPARATUS

(71) Applicant: Wacom Co., Ltd., Saitama (JP)

(72) Inventors: Koji Noguchi, Saitama (JP); Kei Dobashi, Saitama (JP); Kota Imanishi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/216,448

(22) Filed: May 22, 2025

(65) Prior Publication Data

US 2025/0283737 A1 Sep. 11, 2025

Related U.S. Application Data

(63) Continuation of application No. PCT/JP2023/040567, filed on Nov. 10, 2023.

(30) Foreign Application Priority Data

Nov. 28, 2022 (JP) ................................. 2022-188972

(51) Int. Cl.
*G01D 5/20* (2006.01)
*G06F 3/0354* (2013.01)
*G06F 3/041* (2006.01)
*G06F 3/046* (2006.01)
(52) U.S. Cl.
CPC ........... *G01D 5/20* (2013.01); *G06F 3/03545* (2013.01); *G06F 3/041661* (2019.05); *G06F 3/046* (2013.01)
(58) Field of Classification Search
CPC ..... G01D 5/20; G06F 3/0416; G06F 3/04162; G06F 3/041661; G06F 3/03545; G06F 3/046
See application file for complete search history.

(56) References Cited

U.S. PATENT DOCUMENTS

2013/0271426 A1* 10/2013 Yumoto ................ G06F 3/0418
345/173
2017/0357368 A1* 12/2017 Katsuta ............... G06F 3/04166
2022/0004266 A1* 1/2022 Ito .......................... G06N 20/00

FOREIGN PATENT DOCUMENTS

JP 2022145907 A 10/2022

OTHER PUBLICATIONS

International Search Report, mailed Jan. 23, 2024, for International Application No. PCT/JP2023/040567. (4 pages) (With English Translation).

* cited by examiner

*Primary Examiner* — Nathan P Brittingham
(74) *Attorney, Agent, or Firm* — Seed Intellectual Property Law Group LLP

(57) ABSTRACT

A location detection device according to the present disclosure includes an electro-magnetic resonance (EMR) sensor arranged to overlap with a display device, and a sensor controller connected to the EMR sensor. The EMR sensor includes a plurality of loop coils arranged side by side in a first direction of a panel surface. The sensor controller, in operation, detects a location of an electromagnetic induction pen, based on an alternating current generated by using both of a first alternating current output from a first loop coil located proximate one end of the plurality of loop coils in the first direction, and a second alternating current output from a second loop coil located on an opposite side of a center of the panel surface in the first direction from the first loop coil. The accuracy of location detection for an electromagnetic induction pen, performed by using the EMR sensor improved.

6 Claims, 9 Drawing Sheets

F I G . 2
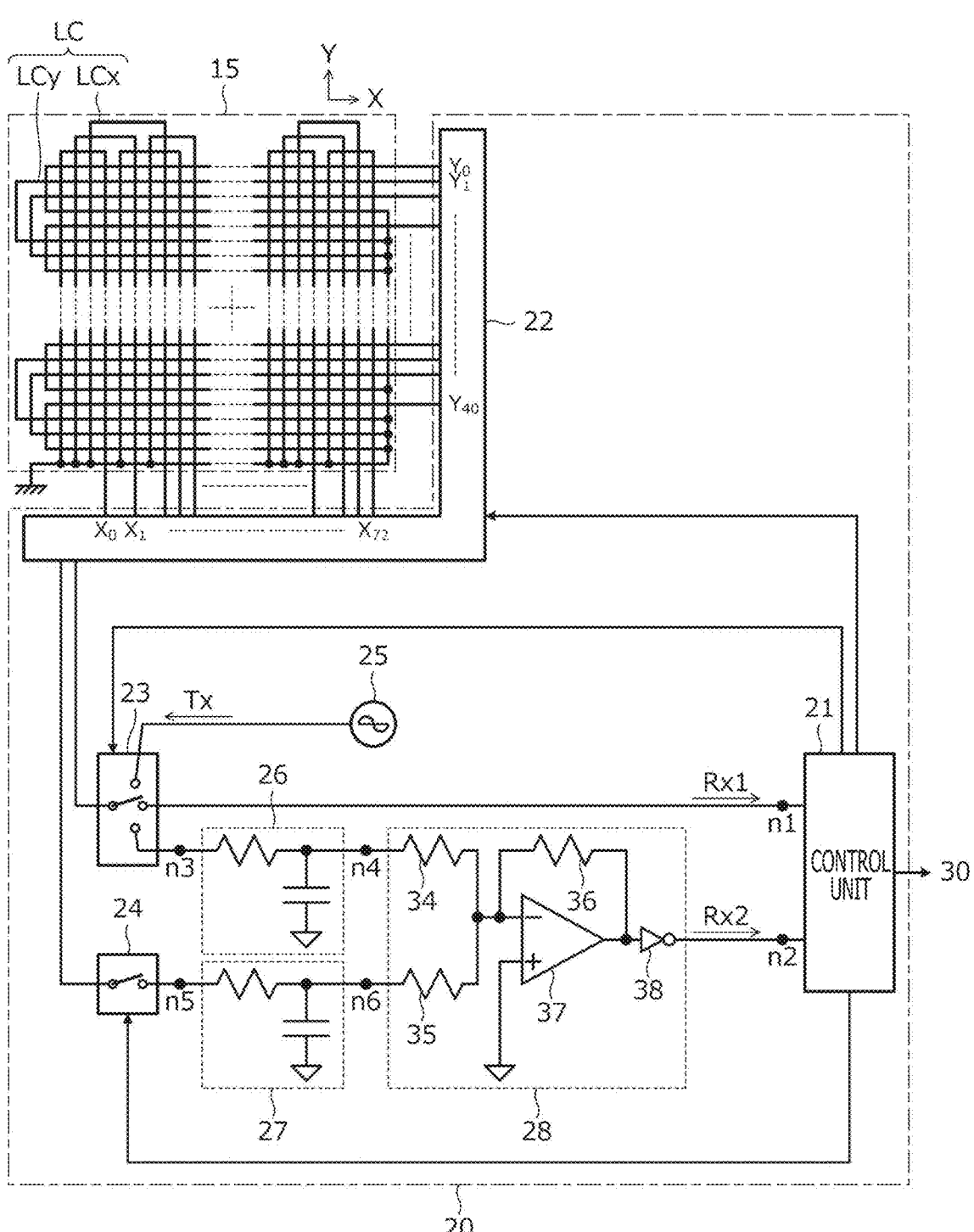

F I G . 6
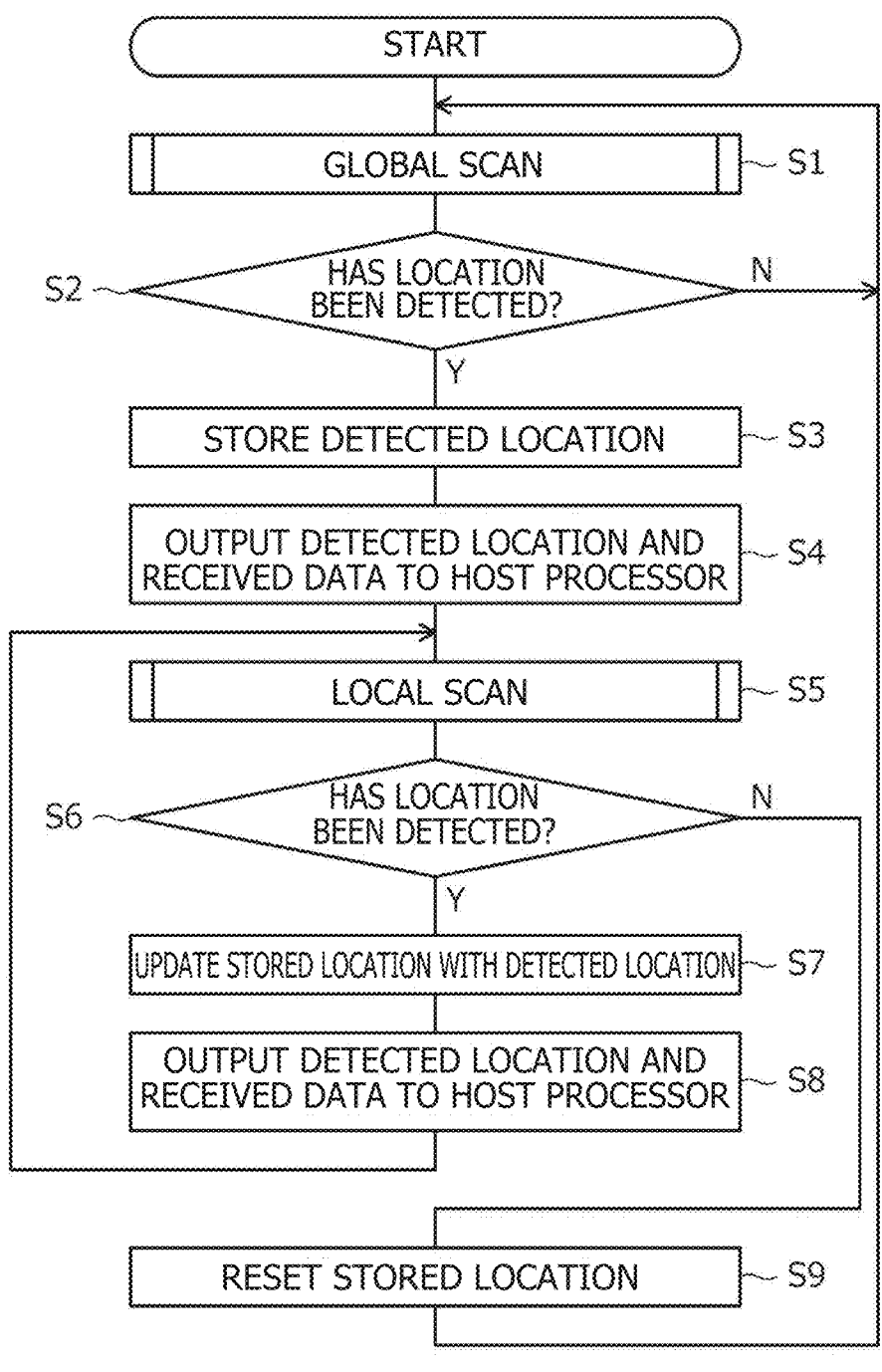

F I G . 7
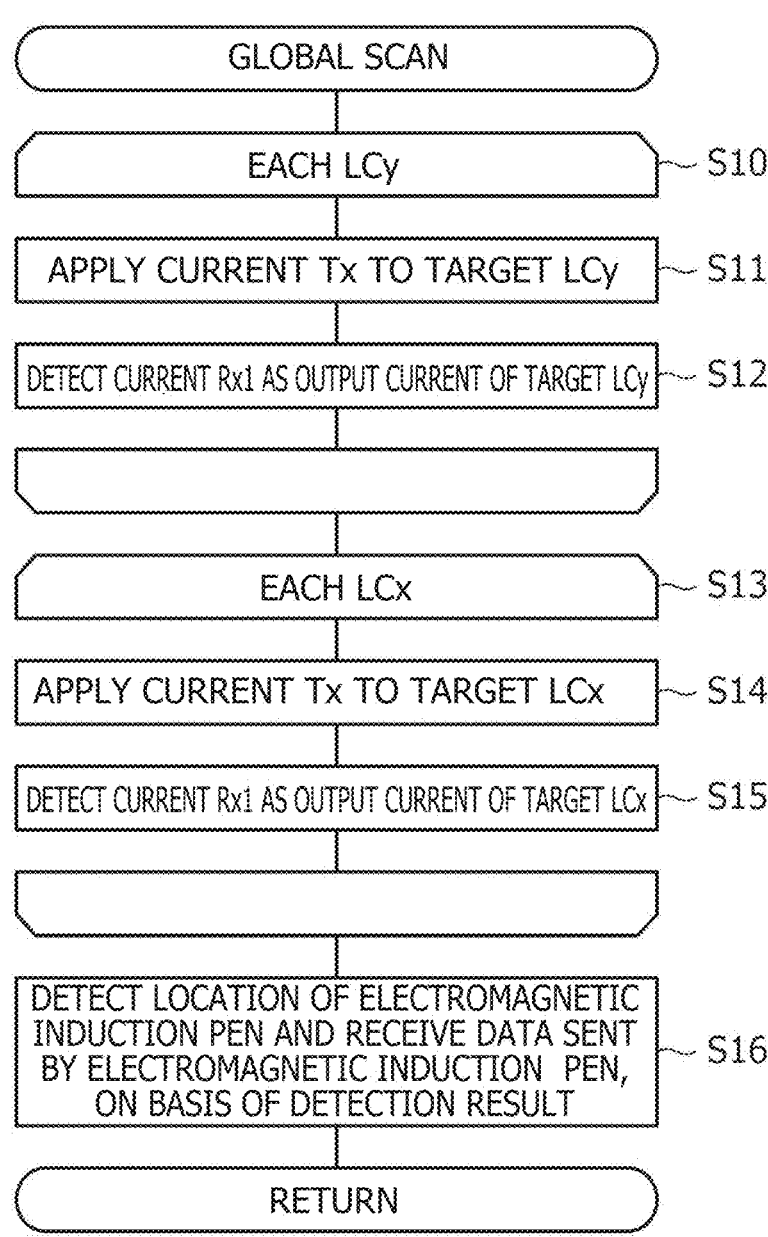

F I G . 8

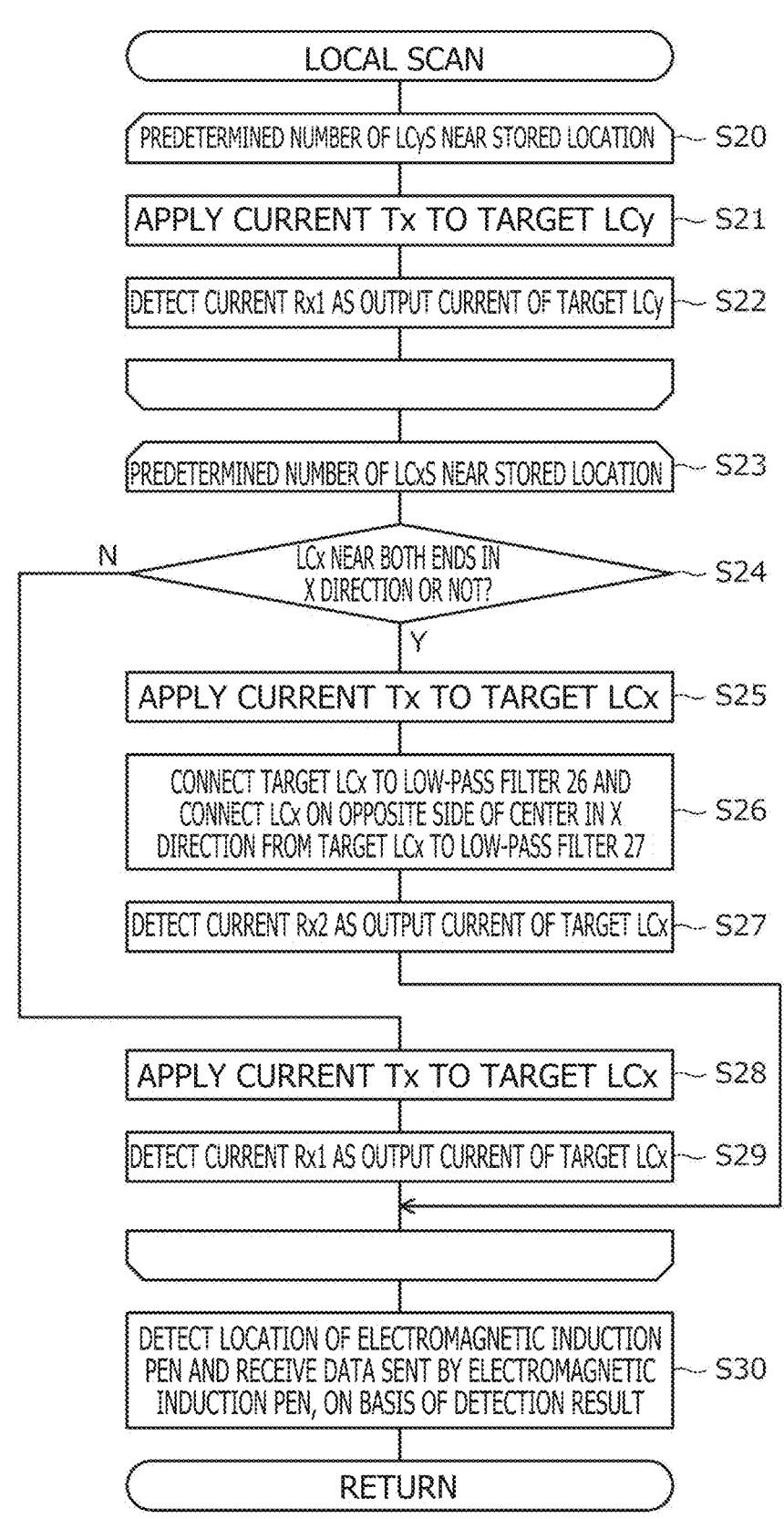

LOCAL SCAN

PREDETERMINED NUMBER OF LCyS NEAR STORED LOCATION — S20

APPLY CURRENT Tx TO TARGET LCy — S21

DETECT CURRENT Rx1 AS OUTPUT CURRENT OF TARGET LCy — S22

PREDETERMINED NUMBER OF LCxS NEAR STORED LOCATION — S23

LCx NEAR BOTH ENDS IN X DIRECTION OR NOT? — S24

N

Y

APPLY CURRENT Tx TO TARGET LCx — S25

CONNECT TARGET LCx TO LOW-PASS FILTER 26 AND CONNECT LCx ON OPPOSITE SIDE OF CENTER IN X DIRECTION FROM TARGET LCx TO LOW-PASS FILTER 27 — S26

DETECT CURRENT Rx2 AS OUTPUT CURRENT OF TARGET LCx — S27

APPLY CURRENT Tx TO TARGET LCx — S28

DETECT CURRENT Rx1 AS OUTPUT CURRENT OF TARGET LCx — S29

DETECT LOCATION OF ELECTROMAGNETIC INDUCTION PEN AND RECEIVE DATA SENT BY ELECTROMAGNETIC INDUCTION PEN, ON BASIS OF DETECTION RESULT — S30

RETURN

FIG. 9A

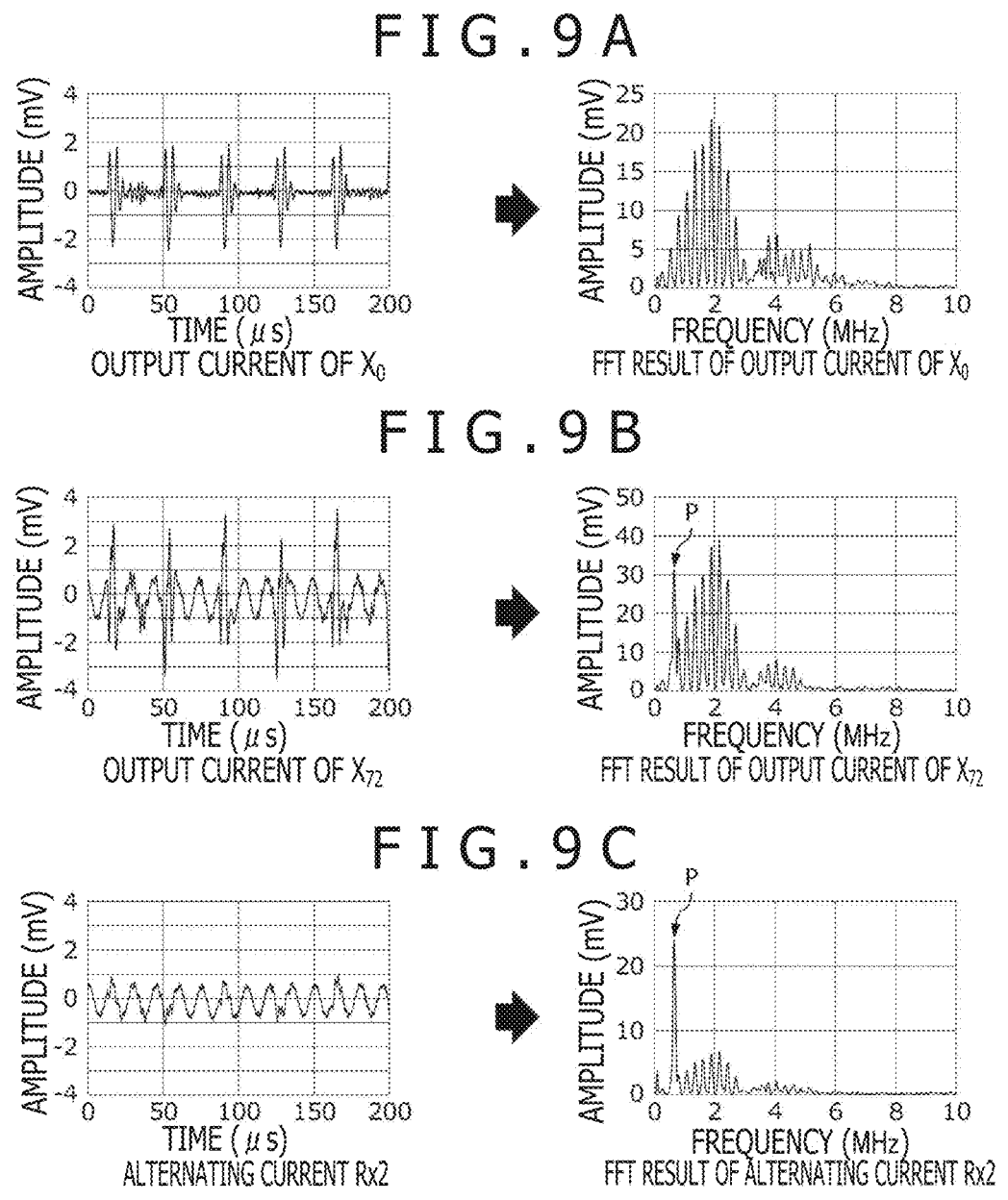

OUTPUT CURRENT OF $X_0$

FFT RESULT OF OUTPUT CURRENT OF $X_0$

FIG. 9B

OUTPUT CURRENT OF $X_{72}$

FFT RESULT OF OUTPUT CURRENT OF $X_{72}$

FIG. 9C

ALTERNATING CURRENT Rx2

FFT RESULT OF ALTERNATING CURRENT Rx2

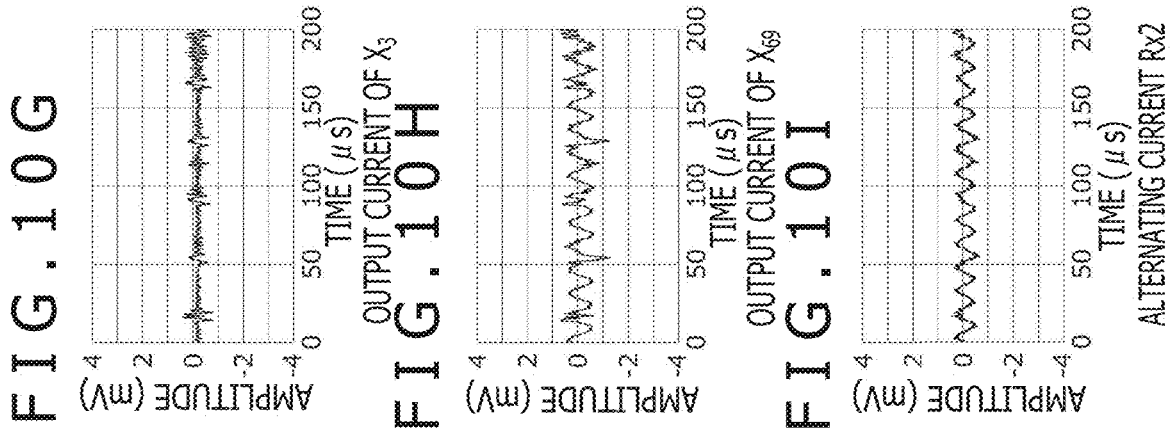
F I G . 1 0 A
F I G . 1 0 D
F I G . 1 0 G
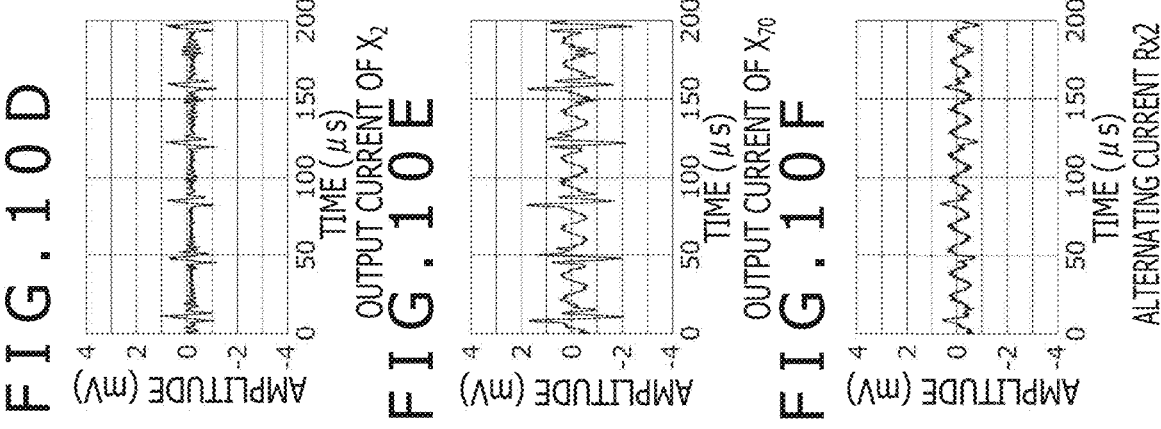
F I G . 1 0 B
F I G . 1 0 E
F I G . 1 0 H
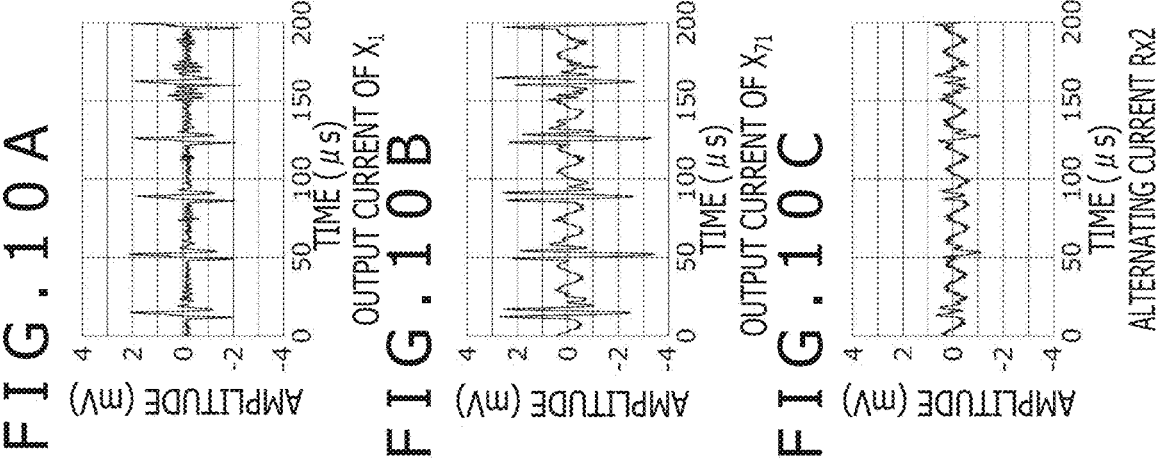
F I G . 1 0 C
F I G . 1 0 F
F I G . 1 0 I

LOCATION DETECTION DEVICE AND ELECTRONIC APPARATUS

BACKGROUND

Technical Field

The present disclosure relates to a location detection device and an electronic apparatus, and more particularly to a location detection device having a sensor arranged to overlap with a display device, and an electronic apparatus including such a location detection device.

Description of the Related Art

Some electronic apparatuses that support pen input, such as smartphones and tablet terminals, are configured to detect the location of an electromagnetic induction pen by using an electro-magnetic resonance (EMR) method, which is a type of electromagnetic induction method. In this type of electronic apparatus, a display device such as a liquid crystal display or an organic electro-luminescence (EL) display is arranged to overlap with an EMR sensor including a plurality of loop coils. Hereinafter, if a direction parallel to one side of a panel surface (touch surface) of the electronic apparatus (e.g., a horizontal direction as seen from a user) is called an X direction, and a direction perpendicular to the X direction (e.g., a depth direction as seen from a user) is called a Y direction, the plurality of loop coils includes a plurality of X-side loop coils that each extend in the Y direction and are arranged side by side in the X direction, and a plurality of Y-side loop coils that each extend in the X direction and are arranged side by side in the Y direction. Patent Document 1 discloses an example of an electronic apparatus having such a configuration.

PRIOR ART DOCUMENT

Patent Document

Patent Document 1: JP 2022-145907A

BRIEF SUMMARY

Technical Problem

The inventors of the present application actually manufactured an electronic apparatus having a display device and an EMR sensor arranged to overlap with each other, and discovered that noise originating from gate lines of the display device has been observed in the alternating current output from some of a plurality of X-side loop coils located near either end of the panel surface while checking the characteristics of the EMR sensor. Such noise reduces the accuracy of location detection of the electromagnetic induction pen, and therefore needs to be reduced.

Accordingly, embodiments of the present disclosure provide a location detection device and electronic apparatus that can improve the accuracy of detecting the location of an electromagnetic induction pen by using an EMR sensor arranged to overlap with a display device.

Technical Solution

A location detection device according to the present disclosure is a location detection device that includes a sensor arranged to overlap with a display device and a sensor controller connected to the sensor, and the sensor includes a plurality of loop coils arranged side by side in a first direction of a panel surface, and the sensor controller, in operation, detects the location of an electromagnetic induction pen based on a third alternating current generated by using both a first alternating current output from a first loop coil that is located proximate one end of the plurality of loop coils in the first direction, and a second alternating current output from a second loop coil that is located on an opposite side of a center of the panel surface in the first direction from the first loop coil.

An electronic apparatus of the present disclosure is an electronic apparatus including a display device and a location detection device, and the location detection device includes a sensor arranged to overlap with the display device and a sensor controller connected to the sensor, and the sensor includes a plurality of loop coils arranged side by side in a first direction of a panel surface, and the sensor controller, in operation, detects the location of an electromagnetic induction pen based on a third alternating current generated by using both a first alternating current output from a first loop coil located proximate one end of the plurality of loop coils in the first direction, and a second alternating current output from a second loop coil located on the opposite side of the center of the panel surface in the first direction from the first loop coil.

Advantageous Effect

According to the present disclosure, the accuracy of detecting the location of an electromagnetic induction pen by using an EMR sensor arranged to overlap with a display device can be improved.

BRIEF DESCRIPTION OF DRAWINGS

FIG. 2 is a diagram illustrating the detailed configuration of an EMR sensor 15 and a sensor controller 20 illustrated in FIG. 1.

FIG. 6 is a diagram illustrating the processing flow of location detection processing of an electromagnetic induction pen 2 executed by a control unit 21 of the sensor controller 20 according to the embodiment of the present disclosure.

FIG. 7 is a diagram illustrating the processing flow of the location detection processing of the electromagnetic induction pen 2 executed by the control unit 21 of the sensor controller 20 according to the embodiment of the present disclosure.

FIG. 8 is a diagram illustrating the processing flow of the location detection processing of the electromagnetic induction pen 2 executed by the control unit 21 of the sensor controller 20 according to the embodiment of the present disclosure.

FIGS. 9A, 9B, and 9C are diagrams illustrating observation results of waveforms of alternating currents appearing in the sensor controller 20 according to the embodiment of the present disclosure, and the result of subjecting the alternating current to an FFT (fast Fourier transform).

FIGS. 10A, 10B, 10C, 10D, 10E, 10F, 10G, 10H, and 10I are diagrams illustrating observation results of waveforms of alternating currents appearing in the sensor controller 20 according to the embodiment of the present disclosure.

DETAILED DESCRIPTION

Hereinafter, an embodiment of the present disclosure will be described in detail with reference to the accompanying drawings.

Figure 1:
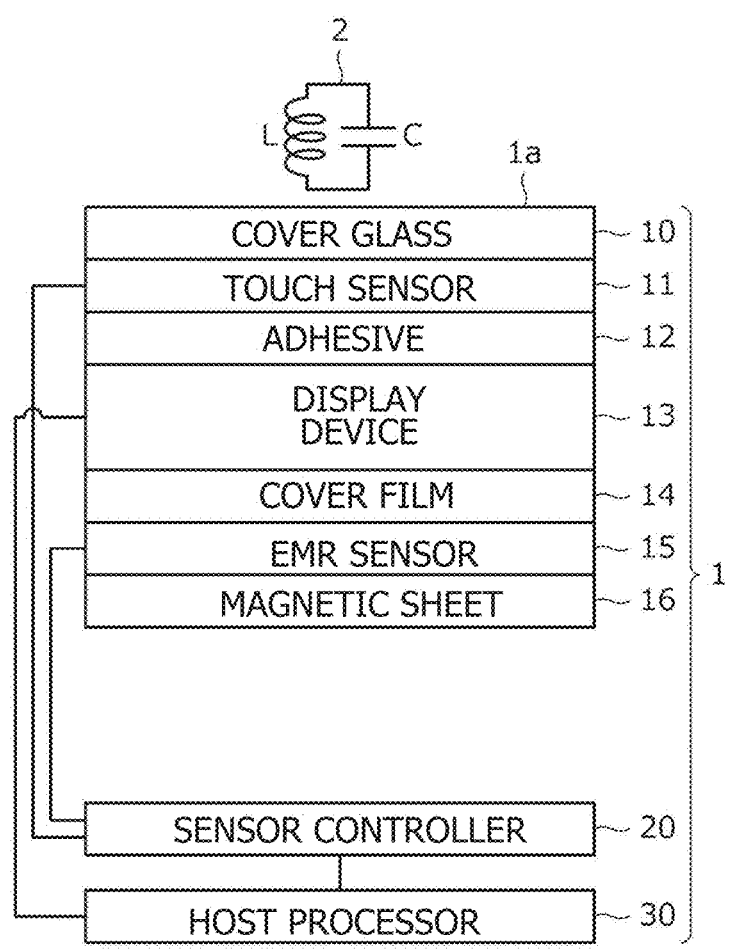
FIG. 1 is a diagram illustrating the configuration of an electronic apparatus 1 according to an embodiment of the present disclosure.

FIG. 1 is a diagram illustrating the configuration of an electronic apparatus 1 according to an embodiment of the present disclosure. The figure also illustrates a resonant circuit included in an electromagnetic induction pen 2. The electronic apparatus 1 is a computer that supports pen input to a display surface, and as illustrated in the figure, is configured to have a configuration in which a cover glass 10, a touch sensor 11, an adhesive 12, a display device 13, a cover film 14, an EMR sensor 15, and a magnetic sheet 16 are stacked in this order from the panel surface 1a, and a sensor controller 20 and a host processor 30. In a typical example, the electronic apparatus 1 is a smartphone or a tablet terminal.

The cover glass 10 is a member that constitutes the surface of the panel surface 1a. The touch sensor 11 is a sensor for detecting the location of a user's finger on the panel surface 1a, and in a typical example, is constituted by a capacitive sensor including a plurality of transparent linear conductors. The adhesive 12 serves to fix the touch sensor 11 to the surface of the display device 13.

The display device 13 is a device that displays an image according to an image signal supplied from the host processor 30, and is configured with a plurality of pixels arranged in a matrix. In a typical example, the display device 13 is a liquid crystal display or an organic EL display. The cover film 14 separates the EMR sensor 15 and the display device 13, and also serves to adhere these to each other.

The EMR sensor 15 is a sensor for detecting the location of the electromagnetic induction pen 2 on the panel surface 1a by the above-mentioned EMR method. The EMR sensor 15 will be described in detail later with reference to FIG. 2. The magnetic sheet 16 is a magnetic material formed on a flat plate, and serves to block out the alternating magnetic field emitted from the EMR sensor 15.

The sensor controller 20 is an integrated circuit that constitutes a location detection device together with the touch sensor 11 and the EMR sensor 15. The sensor controller 20 performs a process of detecting the location of a user's finger on the panel surface 1a by using the touch sensor 11, and a process of detecting the location of the electromagnetic induction pen 2 on the panel surface 1a by using the EMR sensor 15. In addition, when the electromagnetic induction pen 2 has a function of transmitting data (such as a writing pressure value, side switch on/off information, and a pen ID, which will be described later), the sensor controller 20 also performs a process of receiving data transmitted by the electromagnetic induction pen 2 by using the EMR sensor 15. The sensor controller 20 is configured to sequentially supply the detected location and received data to the host processor 30.

The host processor 30 is a central processing unit of the electronic apparatus 1 that executes a program read from a memory (not illustrated) to play a role in executing the operating system and various applications of the electronic apparatus 1. The host processor 30 also plays a role in supplying an image signal obtained as a result of the execution of the program to the display device 13.

The applications executed by the host processor 30 include a drawing application that performs drawing on the basis of a trajectory of the user's finger or the electromagnetic induction pen 2. The drawing application is configured to be capable of executing processes such as generating stroke data (data indicating a trajectory of locations) by using the locations and data supplied from the sensor controller 20, rendering the generated stroke data and displaying the result on the display device 13, generating and recording digital ink including the generated stroke data, and transmitting the generated digital ink to an external device.

The electromagnetic induction pen 2 is a pen-shaped device with a pen tip, and as illustrated in FIG. 1, is configured to have a resonant circuit including a coil L and a capacitor C connected in series. When this resonant circuit enters an alternating magnetic field (described later) emitted from the EMR sensor 15, an electromotive force is generated across both ends of the coil L, and the capacitor C is charged. After that, when the emission of the alternating magnetic field from the EMR sensor 15 is stopped, the charge accumulated in the capacitor C causes the coil L to emit an alternating magnetic field as a reflected signal. The sensor controller 20 is configured to detect the location of the electromagnetic induction pen 2 by detecting this alternating magnetic field.

Here, the capacitor C may be configured by a variable capacitance capacitor whose capacitance changes according to the writing pressure value indicating the pressure applied to the pen tip, the on/off state of the side switch provided on the surface, a pen ID stored in advance, etc. In this case, the capacitance of the capacitor C changes according to the writing pressure value and the on/off state of the switch, and as a result, the frequency of the alternating magnetic field sent from the coil L changes. The sensor controller 20 also performs a process of receiving data transmitted by the electromagnetic induction pen 2 by detecting this frequency change. Hereinafter, the following description will be continued on the assumption that such data transmission and reception is performed between the electromagnetic induction pen 2 and the sensor controller 20.

FIG. 2 is a diagram illustrating detailed configurations of the EMR sensor 15 and the sensor controller 20. Note that, in this figure, only parts of the configuration of the sensor controller 20 related to the EMR sensor 15 are illustrated.

First, focusing on the EMR sensor 15, the EMR sensor 15 includes a plurality of loop coils LC. The plurality of loop coils LC include a plurality of loop coils LCx each extending in the Y direction and arranged side by side in the X direction (X-side loop coils), and a plurality of loop coils LCy each extending in the X direction and arranged side by side in the Y direction (Y-side loop coils). One end of each loop coil LC is grounded, and the other end is connected to the sensor controller 20.

As also illustrated in FIG. 2, the description will be continued on the assumption that the loop coils LCx include 73 loop coils, namely loop coils $X_0$ to $X_{72}$, and the loop coils LCx include 41 loop coils, namely loop coils $Y_0$ to $Y_{40}$ in the present embodiment. However, the numbers 73 and 41 are merely examples, and the number of the loop coils LCx is not limited to 73, and the number of the loop coils LCx is not limited to 41.

Next, focusing on the sensor controller 20, the sensor controller 20 is configured to have a control unit 21, switch units 22 to 24, an oscillator 25, low-pass filters 26 and 27, and an adder 28.

The control unit 21 is a functional unit that controls the connection state of each of the switch units 22 to 24 to transmit an alternating magnetic field from the panel surface 1a, detect the location of the electromagnetic induction pen 2 on the panel surface 1a, and receive data transmitted by the electromagnetic induction pen 2. The control unit 21 first transmits an alternating magnetic field from the panel surface 1a via the EMR sensor 15, and after stopping the transmission, detects the alternating magnetic field transmitted from the electromagnetic induction pen 2 via the EMR sensor 15 as a reflected signal to the alternating magnetic field, thereby detecting the location of the electromagnetic induction pen 2 and receiving the data transmitted by the electromagnetic induction pen 2. In one or more implementations, the control unit 21 includes a processor and a memory storing instructions that, when executed by the processor, cause the control unit 21 to perform the acts of the control unit 21 described herein.

The control unit 21 detects the alternating magnetic field by detecting an alternating current (output current of the loop coil LC) that appears in the loop coil LC due to the alternating magnetic field. The control unit 21 has two input terminals for this alternating current, which will be referred to as nodes n1 and n2, hereinbelow. Further, the alternating current input to node n1 will be referred to as alternating current Rx1, and the alternating current input to node n2 will be referred to as alternating current Rx2.

The switch unit 22 is a switch that connects any one of the loop coils LC to the switch unit 23 or the switch unit 24 in response to the control of the control unit 21. The switch unit 23 is a single-pole-triple-throw switch having a common terminal connected to the switch unit 22 and three selection terminals respectively connected to the oscillator 25, node n1, and low-pass filter 26, and plays a role in connecting any one of the oscillator 25, node n1, and low-pass filter 26 to the switch unit 22 in response to the control of the control unit 21. The switch unit 24 is a single-pole-single-throw switch provided between the switch unit 22 and the low-pass filter 27, and plays a role in connecting or disconnecting the switch unit 22 and the low-pass filter 27 in response to the control of the control unit 21.

The oscillator 25 is a circuit including an oscillator that generates an alternating current Tx. The control unit 21 controls the switch units 22 and 23 to connect the oscillator 25 to one of the loop coils LC, thereby transmitting an alternating magnetic field from the panel surface 1a. To describe in more detail, the oscillator 25 supplies an alternating current Tx to the loop coil LC connected to the oscillator 25 via the switch units 22 and 23. When the alternating current Tx is supplied in this manner, an alternating magnetic field is generated around the loop coil LC. This alternating magnetic field becomes the alternating magnetic field transmitted from the panel surface 1a.

The low-pass filter 26 is an RC filter including a resistive element and a capacitive element, and serves to remove high-frequency components contained in the output current of the loop coil LC connected via the switch units 22 and 23. Similarly, the low-pass filter 27 is also an RC filter including a resistive element and a capacitive element, and serves to remove high-frequency components contained in the output current of the loop coil LC connected via the switch units 22 and 24. The cutoff frequencies of the low-pass filters 26 and 27 are set to a value (e.g., 1 MHz) that is sufficiently higher than the frequency of the alternating magnetic field emitted by the electromagnetic induction pen 2 (e.g., 660 kHz). Hereinafter, the input end and output end of the low-pass filter 26 are referred to as nodes n3 and n4, respectively, and the input end and output end of the low-pass filter 27 are referred to as nodes n5 and n6, respectively.

The adder 28 is a circuit that generates an alternating current Rx2 by adding the output current of the low-pass filter 26 and the output current of the low-pass filter 27. In a specific example, the adder 28 includes resistance elements 34 to 36, an operational amplifier 37, and an inverting buffer 38. The resistance element 34 is connected between the inverting input terminal of the operational amplifier 37 and a node n4. The resistance element 35 is connected between the inverting input terminal of the operational amplifier 37 and a node n6. The resistance element 36 is connected between the inverting input terminal and the output terminal of the operational amplifier 37. The non-inverting input terminal of the operational amplifier 37 is grounded, and the output terminal of the operational amplifier 37 is connected to the node n2 via the inverting buffer 38. The resistance elements 34 to 36 have the same resistance value. According to such a configuration of the adder 28, the alternating current Rx2 is a current obtained by adding the output current of the low-pass filter 26 and the output current of the low-pass filter 27.

The control unit 21 normally detects the location of the electromagnetic induction pen 2 and receives data transmitted by the electromagnetic induction pen 2 on the basis of the alternating current Rx1. On the other hand, after once detecting the location of the electromagnetic induction pen 2, for a predetermined number of loop coils LCx located at either end of the panel surface 1a in the X-direction, the control unit 21 detects the location of the electromagnetic induction pen 2 and receives data transmitted by the electromagnetic induction pen 2 on the basis of the alternating current Rx2. By the control unit 21 performing such processing, the electronic apparatus 1 according to the present embodiment can reduce noise derived from the gate lines of the display device 13 that is superposed on the output current of the loop coils LCx. This point will be described in detail below.

Figure 3:
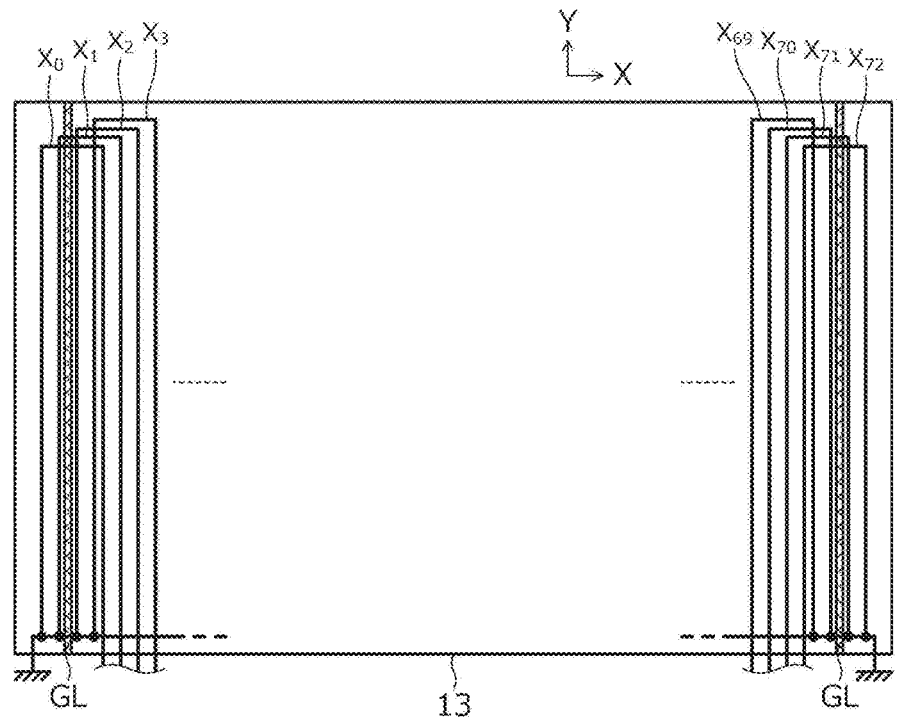
FIG. 3 is a schematic diagram illustrating how a display device 13 and some of loop coils LCx in the EMR sensor 15 are arranged to overlap with each other.

FIG. 3 is a schematic diagram illustrating how the display device 13 and some of the loop coils LCx in the EMR sensor 15 are arranged to overlap with each other. As illustrated in the figure, the display device 13 has gate lines GL each extending in the Y direction at both ends in the X direction, and some located near either end of the plurality of loop coils LCx in the X direction extend while overlapping with this gate line GL. Extending while overlapping with the gate line GL means that a signal flowing through the gate line GL is superposed on the loop coil LCx. In fact, a drive signal (a signal for controlling the on/off of transistors arranged in pixels) is supplied to the gate line GL from the host processor 30, and this drive signal is superposed as noise on the output current of the loop coil LCx located near either end in the X direction. Such noise causes a decrease in the accuracy of the location detection of the electromagnetic induction pen 2 and the data reception from the electromagnetic induction pen 2 performed by the control unit 21, and therefore needs to be reduced. Note that the frequency band of the drive signal and the frequency band of the alternating magnetic field emitted by the electromagnetic induction pen 2 overlap with each other, so it is difficult to remove this noise only by a filter.

Figure 4:
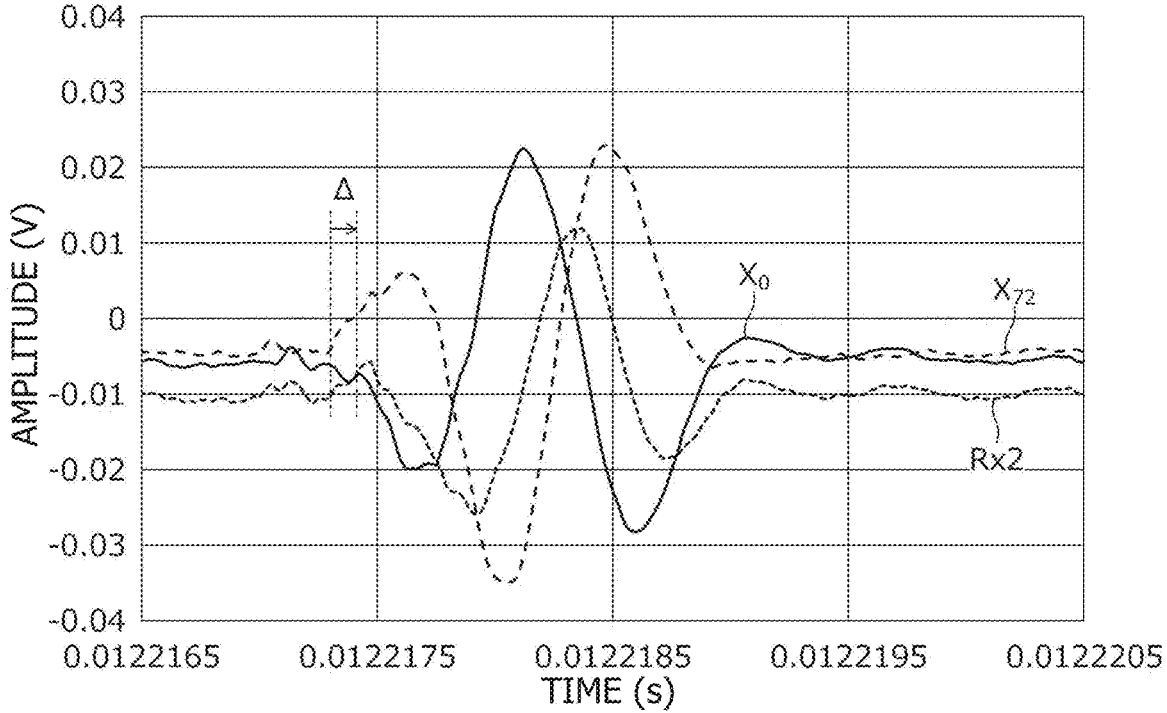
FIG. 4 is a diagram illustrating measurement results of noise originating from a gate line GL observed in each of the loop coils $X_0$ and $X_{72}$.

Here, FIG. 4 is a diagram illustrating the measurement results of the noise derived from the gate line GL and superposed on each of the output currents of loop coil $X_0$ and loop coil $X_{72}$. The horizontal axis of the figure represents time, and the vertical axis represents amplitude. As can be seen from the figure, the drive signals applied to the two gate lines GL located at both ends in the X direction are roughly inverted signals. Therefore, by adding the output current of the loop coil LCx located near one end in the X direction (hereinafter referred to as the "first loop coil LCx") (first alternating current) and the output current of the loop coil LCx located on the opposite side of the center of the panel surface 1a in the X direction from the first loop coil LCx (hereinafter referred to as the "second loop coil LCx") (second alternating current), the noise derived from the gate line GL can be canceled.

Therefore, when detecting the output current of the first loop coil LCx, the control unit 21 according to the present embodiment appropriately controls the switch units 22 to 24 illustrated in FIG. 2 to connect the first loop coil LCx to the low-pass filter 26 and the second loop coil LCx to the low-pass filter 27. Then as a result, the alternating current Rx2 input to the node n2 (third alternating current) is obtained as the output current of the first loop coil LCx. In this way, the noise derived from the gate line GL and superposed on the output current of the first loop coil LCx is cancelled by the noise derived from the gate line GL and superposed on the output current of the second loop coil LCx in the adder 28, so that the noise derived from the gate line GL is reduced in the alternating current Rx2. A similar manner applies when detecting the output current of the second loop coil LCx.

FIG. 4 also illustrates the measurement result of the alternating current Rx2 corresponding to the illustrated noise waveform (the waveform of noise derived from the gate line GL and superposed on each of the output current of the loop coil $X_0$ and the output current of the loop coil $X_{72}$). Also, from the result in the figure, it can be understood that the process performed by the control unit 21 according to the present embodiment can reduce the noise derived from the gate line GL and superposed on the output current of the loop coil LCx. In the example illustrated in the figure, the amplitude of the noise derived from the gate line GL is reduced to approximately half.

It is to be noted that as illustrated in FIG. 4, the drive signal applied to one of the two gate lines GL located at both ends in the X direction may have a slight delay β (e.g., a delay of 2 μs) with respect to the inverted signal of the drive signal applied to the other of the two gate lines GL located at both ends in the X direction. The low-pass filters 26 and 27 illustrated in FIG. 2 are provided to absorb this delay β, and since the waveform of the noise becomes dull by the currents passing through the low-pass filters 26 and 27, the sensor controller 20 according to the present embodiment can reduce the noise derived from the gate lines GL and superposed on the output current of the loop coil LCx even if there is a delay β.

Figure 5:
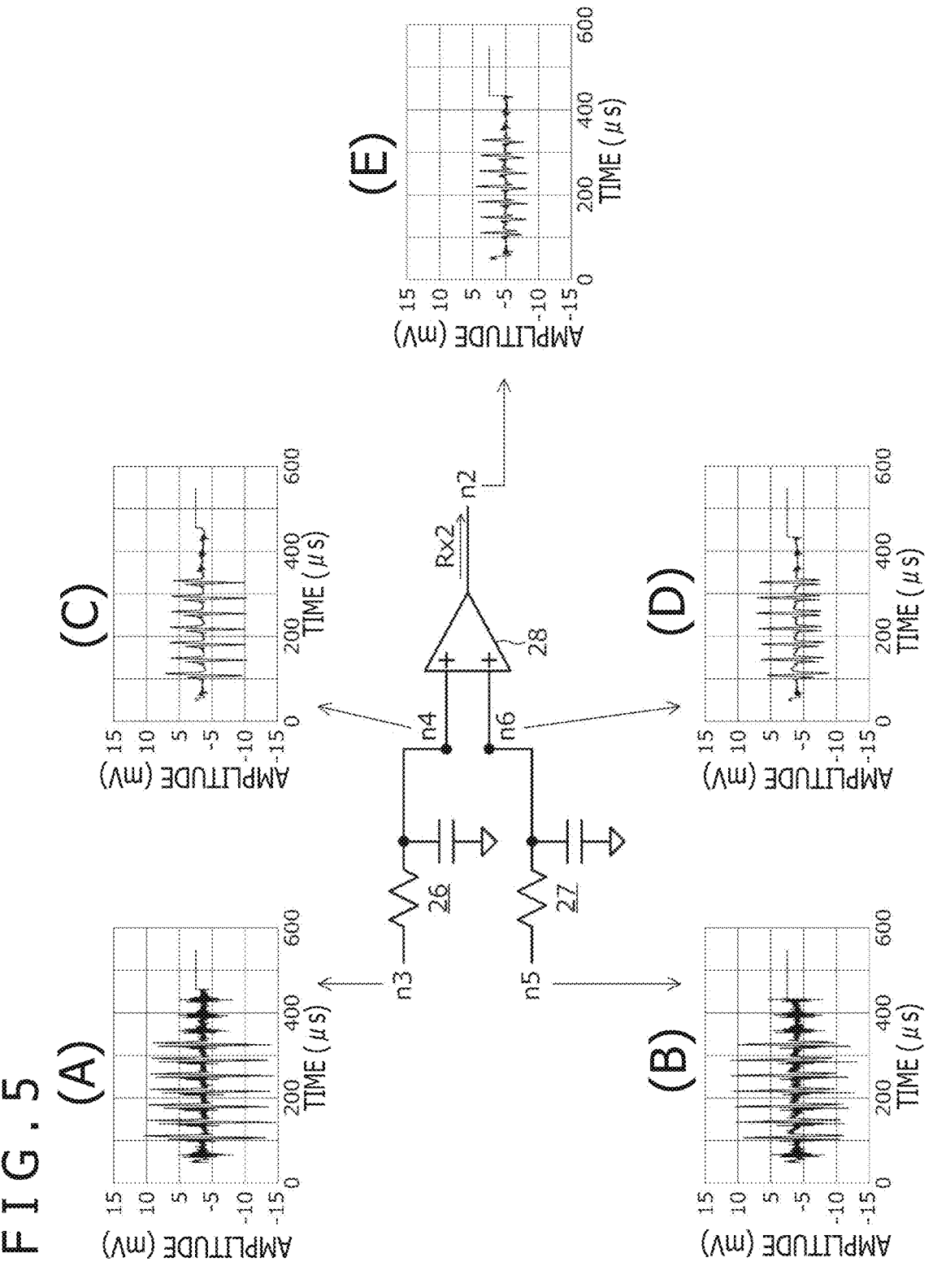
FIG. 5 is a diagram illustrating simulation results of waveforms of alternating currents appearing at each of the nodes n2 to n6.

FIG. 5 is a diagram illustrating a simulation result of the waveform of the alternating current appearing at each of the nodes n2 to n6. The diagram illustrates an example in which the loop coil $X_{72}$ is connected to the node n3 and the loop coil $X_0$ is connected to the node n5, with no electromagnetic induction pen 2 present near either of the loop coils $X_0$ and $X_{72}$. Also, portions (A), (B), (C), (D), and (E) of FIG. 5 illustrate the waveforms of the noises of alternating current appearing at the nodes n3, n5, n4, n6, and n2, respectively. The horizontal axis of each diagram represents time, and the vertical axis represents amplitude. Also, from the simulation results illustrated in FIG. 5, it can be seen that the noises derived from the gate line GL and superposed on the output current of the loop coil LCx are reduced by the processing of the low-pass filters 26 and 27 and the adder 28.

FIGS. 6 to 8 are diagrams illustrating the process flow of the location detection process of the electromagnetic induction pen 2 executed by the control unit 21 of the sensor controller 20 according to the present embodiment. Hereinafter, with reference to these diagrams, the process for reducing the noise derived from the gate line GL and superposed on the output current of the loop coil LCx will be described in more detail.

Referring to FIG. 6 first, the control unit 21 first performs a global scan, which is a process for newly detecting the location of the electromagnetic induction pen 2 whose location has not yet been detected (S1).

FIG. 7 illustrates details of the global scan executed at S1 of FIG. 6. As illustrated in FIG. 7, the control unit 21 first performs the processes of S11 and S12 for each of the plurality of loop coils LCy (S10). S11 is a process of applying an alternating current Tx to the target loop coil LCy by appropriately controlling the switch units 22 and 23. S12 is a process of switching the switch unit 23 to the node n1 side and detecting the alternating current Rx1 input to the node n1 as the output current of the target loop coil LCy.

Next, the control unit 21 performs the processes of S14 and S15 for each of the plurality of loop coils LCx (S13). The processes of S14 and S15 are similar to the processes of S11 and S12, except change of the loop coil to be targeted from the target loop coil LCy to the target loop coil LCx.

After completing the processing of S10 to S15, the control unit 21 detects the location of the electromagnetic induction pen 2 and receives data transmitted by the electromagnetic induction pen 2 on the basis of the detection results of the output currents of the loop coils LCx and LCy (S16). To be specific, the control unit 21 detects the Y coordinate of the location of the electromagnetic induction pen 2 on the basis of the amplitude of the alternating current Rx1 detected in each loop coil LCy, and detects the X coordinate of the location of the electromagnetic induction pen 2 on the basis of the amplitude of the alternating current Rx1 detected in each loop coil LCx. Further, the control unit 21 also detects the frequency of the alternating current Rx1 detected in the one of the plurality of loop coils LCy or the plurality of loop coils LCx that is closest to the detected location, and obtains the data transmitted by the electromagnetic induction pen 2 on the basis of the result.

Returning to FIG. 6, the control unit 21 having completed the process of S1 determines whether or not the location of the electromagnetic induction pen 2 has been detected at S1 (S2). As a result, when it is determined that the location has not been detected, the control unit 21 returns to S1 and performs the global scan again. On the other hand, when it is determined that the location has been detected, the control unit 21 stores the detected location (S3) and outputs the detected location and the received data to the host processor 30 (S4). Then, the control unit 21 performs a local scan, which is a process for updating the location of the electromagnetic induction pen 2 whose location has already been stored (S5).

FIG. 8 illustrates details of the local scan executed at S5 in FIG. 6. As illustrated in the figure, the control unit 21 first performs the processes of S21 and S22 for each of a predetermined number (e.g., three or four) of loop coils LCy located near the stored location (S20). The processes of S21 and S22 are similar to the processes of S11 and S12 illustrated in FIG. 7.

Next, the control unit 21 performs the processes of S24 to S29 for each of a predetermined number (e.g., three or four) of loop coils LCx that are in the vicinity of the stored location (S23). To specifically describe the processes of S24 to S29, the control unit 21 first determines whether or not the target loop coil LCx is a loop coil LCx that is located in the vicinity of either end in the X direction (S24). To be specific, a table is stored in advance that stores for each loop coil LCx whether or not it is located in the vicinity of either end in the X direction, and the determination of S24 can be performed by referring to this table.

When it is determined at S24 that the loop coil LCx is not located near either end in the X direction, the control unit 21 controls the switch units 22 and 23 appropriately to apply an alternating current Tx to the target loop coil LCx (S28), and then switches the switch unit 23 to the node n1 side to detect the alternating current Rx1 input to the node n1 as the output current of the target loop coil LCx (S29). The processes at S28 and S29 are the same as those at S14 and S15 illustrated in FIG. 7.

Conversely, the control unit 21 that has determined at S24 that the loop coil LCx is located near either end in the X direction, applies an alternating current Tx to the target loop coil LCx by appropriately controlling the switch units 22 and 23 (S25), and then connects the target loop coil LCx to the low-pass filter 26 and a loop coil LCx on the opposite side of the center in the X direction from the target loop coil LCx to the low-pass filter 27 by appropriately controlling the switch units 22 to 24 (S26). Then, the alternating current Rx2 input to the node n2 is detected as the output current of the target loop coil LCx (S27).

The control unit 21 having completed the processing of S20 to S29 detects the location of the electromagnetic induction pen 2 and receives data transmitted by the electromagnetic induction pen 2 on the basis of the detection results of the output currents of the loop coils LCx and LCy (S30). This processing is similar to the processing of S16 illustrated in FIG. 7, except that the number of the loop coils LCx and LCy to be processed is reduced.

Returning to FIG. 6, the control unit 21 having completed the process of S5 determines whether or not the location of the electromagnetic induction pen 2 has been detected at S5 (S6). As a result, when it is determined that the location has not been detected, the control unit 21 resets the stored location (S9), and returns to S1 to perform the global scan. On the other hand, when it is determined that the location has been detected, the control unit 21 updates the stored location with the detected location (S7), and outputs the detected location and the received data to the host processor 30 (S8). Then, the control unit 21 returns to S5 to perform the local scan again.

As described above, according to the electronic apparatus 1 of the present embodiment, at the time of detecting the output current of the loop coil LCx which is located near either end in the X direction and on which noise derived from the gate line GL is superposed, the output current of an loop coil LCx located on the opposite side of the center of the panel surface 1a in the X direction from the loop coil LCx is added to the output current of the loop coil LCx, so that the noise derived from the gate line GL of the display device 13 and superposed on the output current of the loop coil LCx can be reduced. Therefore, according to the electronic apparatus 1 of the present embodiment, the accuracy of detecting the location of the electromagnetic induction pen 2 by using the EMR sensor 15 arranged to overlap with the display device 13 can be improved. Further, the accuracy of receiving data transmitted by the electromagnetic induction pen 2 can also be improved.

Furthermore, according to the electronic apparatus 1 of the present embodiment, since the low-pass filters 26 and 27 are provided in front of the adder 28, noise derived from the gate lines GL and superposed on the output current of the loop coil LCx can be reduced even if there is a slight deviation in the timing of the drive signals between the two gate lines GL located at both ends in the X direction.

FIGS. 9A, 9B, and 9C are diagrams illustrating observation results of the waveform of the alternating current appearing in the sensor controller 20 according to the present embodiment and the result of FFT (Fast Fourier Transform) of the alternating current. This figure illustrates an example in which the loop coil $X_0$ is connected to node n5 and the loop coil $X_{72}$ is connected to node n3 with the electromagnetic induction pen 2 present in the vicinity of the loop coil $X_{72}$.

The left sides of FIGS. 9A and FIG. 9B illustrate the output currents of the loop coils $X_0$ and $X_{72}$, respectively, and the right sides of FIG. 9A and FIG. 9B illustrate the FFT results of the output currents of the loop coils $X_0$ and $X_{72}$, respectively. Further, the left side of FIG. 9C illustrates the alternating current Rx2, and the right side of FIG. 9C illustrates the FFT results of the alternating current Rx2. The horizontal axis of the left sides FIG. 9A, FIG. 9B, and FIG. 9C represents time, and the vertical axis represents amplitude. Meanwhile, the horizontal axis of the right sides of FIG. 9A, FIG. 9B, and FIG. 9C represents the frequency, and the vertical axis represents amplitude.

P illustrated in the right side of FIG. 9B represents the frequency of the alternating magnetic field emitted from the electromagnetic induction pen 2. In a typical example, P=660 kHz. As illustrated in the right sides of FIG. 9B and FIG. 9C, a large peak is observed at frequency P in the output current of the loop coil $X_{72}$, whereas no such peak is observed in the output current of the loop coil $X_0$. This reflects that the electromagnetic induction pen 2 is present in the vicinity of the loop coil $X_{72}$, whereas no electromagnetic induction pen 2 is present in the vicinity of the loop coil $X_0$. In the output current waveform, the sine waveform that appears in the left side of FIG. 9B and does not appear in the left side of FIG. 9A corresponds to the waveform of frequency P.

In view of the right sides of FIG. 9A and FIG. 9B, both the output currents of the loop coils $X_0$ and $X_{72}$ have a plurality of peaks over a wide frequency band including the vicinity of the frequency P. These plurality of peaks are generated by the drive signal flowing through the gate line GL, and are noise for the sensor controller 20. In contrast, in the alternating current Rx2 illustrated in the right side of FIG. 9C, the other peaks are significantly suppressed while the peak of the frequency P remains. Also, in view of the waveform in the left side of FIG. 9C, it can be seen that the noise is suppressed compared to the waveform in the left side of FIG. 9B, and the sine wave of the frequency P appears more clearly. From this, it can be said that the electronic apparatus 1 according to the present embodiment achieves the reduction of noise derived from the gate line GL and superposed on the output current of the loop coil LCx.

FIGS. 10A, 10B, 10C, 10D, 10E, 10F, 10G, 10H, and 10I are diagrams illustrating observation results of the waveform of an alternating current appearing in the sensor controller 20 according to the present embodiment. FIG. 10A, FIG. 10B, and FIG. 10C illustrate an example in which loop coil $X_1$ is connected to the node n5 and loop coil $X_{71}$ is connected to the node n3 in a state where the electromagnetic induction pen 2 is present near the loop coil $X_{71}$, and FIG. 10D, FIG. 10E, and FIG. 10F illustrate an example in which loop coil $X_2$ is connected to the node n5 and loop coil $X_{70}$ is connected to the node n3 in a state where the electromagnetic induction pen 2 is present near the loop coil $X_{70}$, and FIG. 10G, FIG. 10H, and FIG. 10I illustrate an example in which loop coil $X_3$ is connected to the node n5 and loop coil $X_{69}$ is connected to the node n3 in a state where the electromagnetic induction pen 2 is present near the loop coil $X_{69}$. The horizontal axis of each diagram represents time, and the vertical axis represents amplitude.

In view of FIG. 10A, FIG. 10D, and FIG. 10G, it can be seen that the noise decreases in the order of the loop coil $X_1$, loop coil $X_2$, and loop coil $X_3$. A similar manner applies to the loop coil $X_{71}$, loop coil $X_{70}$, and loop coil $X_{69}$ illustrated in FIG. 10B, FIG. 10E, and FIG. 10H. This is due to the distance from the gate line GL. On the other hand, in any of FIG. 10C, FIG. 10F, and FIG. 10I, in the alternating current Rx2, the other frequency components are significantly suppressed while the frequency P component remains. Therefore, it can be said that in the electronic apparatus 1 according to the present embodiment, the noise derived from the gate line GL is reduced not only in the loop coils $X_0$ and $X_{72}$ located at the endmost parts, but also in the loop coils adjacent to the endmost parts.

Although the preferred embodiment of the present disclosure has been described above, the present disclosure is not limited to the embodiment, and it goes without saying that the present disclosure can be embodied in various forms without departing from the spirit of the present disclosure.

For example, in the above embodiment, an example has been described in which location detection, etc., is performed by using the alternating current Rx2 only during the local scan, and location detection, etc., is performed by using the alternating current Rx1 during the global scan, but location detection, etc., may also be performed by using the alternating current Rx2 during the global scan. However, since noise is not much of a problem during the global scan, it is acceptable to perform location detection, etc., by using the alternating current Rx2 only during the local scan, as in the present embodiment.

In addition, in the above embodiment, an example has been described in which the output current of the first loop coil LCx and the output current of the second loop coil LCx are added together, but in cases where the winding directions of the loop coils LCx are opposite to each other at both ends in the X direction, the output current of the second loop coil LCx may be subtracted from the output current of the first loop coil LCx.

According to the process described in the above embodiment, when location detection or the like is performed by using the alternating current Rx2, the two loop coils LCx are connected in parallel as viewed from the control unit 21, and therefore the inductance is ½ compared to when location detection or the like is performed by using the alternating current Rx1. Therefore, the control unit 21 may perform a process to double the amplitude of the detected alternating current Rx2. This process is preferably performed in the digital domain by firmware of the sensor controller 20.

DESCRIPTION OF REFERENCE SYMBOLS

1: Electronic apparatus
1a: Panel surface
2: Electromagnetic induction pen
10: Cover glass
11: Touch sensor
12: Adhesive
13: Display device
14: Cover film
15: EMR sensor
15: Cover film
16: Magnetic sheet
20: Sensor controller
21: Control unit
22-24: Switch unit
25: Oscillator
26, 27: Low-pass filter
28: Adder
30: Host processor
34 to 36: Resistance element
37: Operational amplifier
38: Inverting buffer
C: Capacitor
GL: Gate line
L: Coil
LC, LCx, LCy: Loop coil The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A location detection device comprising:
a sensor arranged to overlap with a display device; and
a sensor controller connected to the sensor,
wherein the sensor includes a plurality of loop coils arranged side by side in a first direction of a panel surface,
wherein the sensor controller, in operation, detects a location of an electromagnetic induction pen, based on a third alternating current generated by using both a first alternating current output from a first loop coil located proximate one end of the plurality of loop coils in the first direction and a second alternating current output from a second loop coil located on an opposite side of a center of the panel surface in the first direction from the first loop coil and
wherein noise derived from a gate line and superposed on the first alternating current of the first loop coil is cancelled by noise derived from the gate line and superposed on the second alternating current of the second loop coil.

2. The location detection device according to claim 1, wherein
the sensor controller, in operation, generates the third alternating current by adding the first alternating current and the second alternating current.

3. The location detection device according to claim 1, wherein the sensor controller includes a first low-pass filter and a second low-pass filter, and generates the third alternating current by adding the first alternating current that has passed through the first low-pass filter and the second alternating current that has passed through the second low-pass filter.

4. The location detection device according to claim 3, wherein a cutoff frequency of each of the first low-pass filter and the second low-pass filter is set to a frequency higher than a frequency of an alternating magnetic field emitted from the electromagnetic induction pen.

5. The location detection device according to claim 1, wherein the sensor controller detects the location of the electromagnetic induction pen, based on the third alternating current when the location of the electromagnetic induction pen has already been detected, and detects the location of the electromagnetic induction pen, based on the first alternating current when the location of the electromagnetic induction pen has not yet been detected.

6. An electronic apparatus comprising:

a display device; and a location detection device, wherein the location detection device includes:

a sensor arranged to overlap with the display device, and a sensor controller connected to the sensor, and wherein the sensor includes a plurality of loop coils arranged side by side in a first direction of a panel surface, wherein the sensor controller, in operation, detects a location of an electromagnetic induction pen, based on a third alternating current generated by using both a first alternating current output from a first loop coil located proximate one end of the plurality of loop coils in the first direction, and a second alternating current output from a second loop coil located on an opposite side of a center of the panel surface in the first direction from the first loop coil, and wherein noise derived from a gate line and superposed on the first alternating current of the first loop coil is cancelled by noise derived from the gate line and superposed on the second alternating current of the second loop coil.

\* \* \* \* \*